US005606788A

United States Patent [19]

Rubino et al.

[11] Patent Number: 5,606,788

[45] Date of Patent: Mar. 4, 1997

[54] PULLING TOOL

[76] Inventors: Michael Rubino, 7419 W. Ardmore, Chicago, Ill. 60631; Michael Berg, 335 Oak St., Elgin, Ill. 60133

[21] Appl. No.: 454,638

[22] Filed: May 31, 1995

Related U.S. Application Data

[60] Division of Ser. No. 219,444, Mar. 29, 1994, Pat. No. 5,479,688, which is a continuation-in-part of Ser. No. 61,362, May 12, 1993, Pat. No. 5,390,404, which is a continuation-in-part of Ser. No. 900,348, Jun. 18, 1992, Pat. No. 5,211,211, which is a continuation-in-part of Ser. No. 737,046, Jul. 29, 1991, Pat. No. 5,163,211.

[51] Int. Cl.[6] .......... B23P 19/04

[52] U.S. Cl. .......... 29/259; 29/261; 29/426.5; 29/598; 29/764

[58] Field of Search .......... 29/426.5, 258–262, 29/267, 764, 762, 758, 596, 598

[56] References Cited

U.S. PATENT DOCUMENTS

| | | | |
|---|---|---|---|
| 2,170,461 | 8/1939 | Pepperdine | 29/261 |
| 2,188,074 | 1/1940 | Condon | 29/261 |
| 4,077,103 | 3/1978 | Kelley | 29/259 |

*Primary Examiner*—Carl E. Hall
*Attorney, Agent, or Firm*—Milton Gerstein

[57] ABSTRACT

An improved tool for pulling off a rotor of a motor from a shaft or a fan from a shaft, which improved tool is provided with hooked arms that are releasably but securely held at one end in the housing, without the use of retaining clips, so that the arms do not fall off during use or become lost, and so that they do not interfere with the use of the tool when using the securing bolts for pulling off a rotor. The housing of the improved tool of the invention is circular in shape, and in a first version, is provided with a plurality of equally-spaced holes about its circumference, which holes received the hooked ends of the hooked arms, so that various configurations of hooked arms may be provided to best suit the configuration of vanes and type of fan being pulled off a shaft. In another version, instead of the plurality of equally-spaced holes for holding the hooked ends of the hooked arms, an annular groove is provided on the upper, horizontal surface of the lower circular cross-sectioned section of the housing, which annular groove is preferably continuous for 360 degrees about the upper, horizontal surface of the lower circular cross-sectioned section of the housing, whereby there is provided substantially an infinite spacing capability to the hooked ends of the hooked arms.

11 Claims, 5 Drawing Sheets

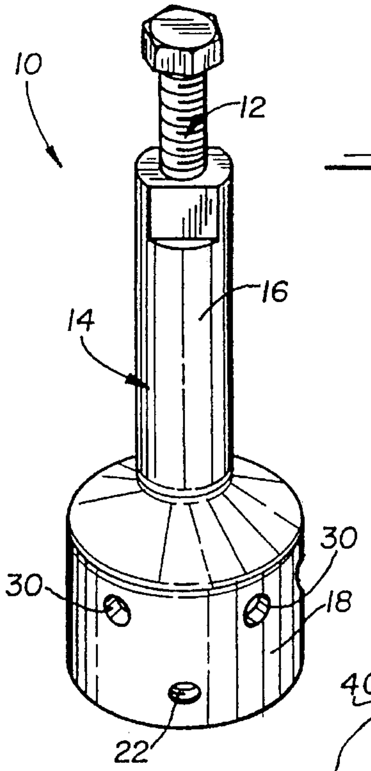
FIG. 1
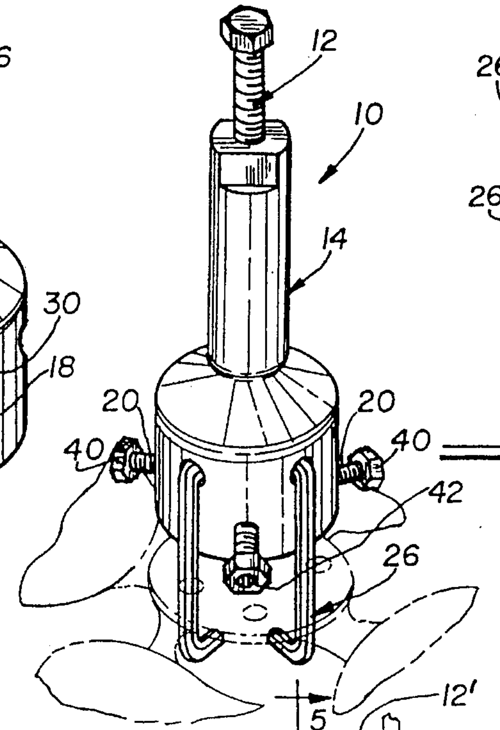
FIG. 2
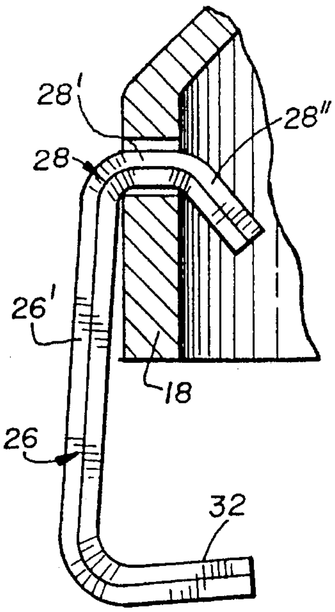
FIG. 3
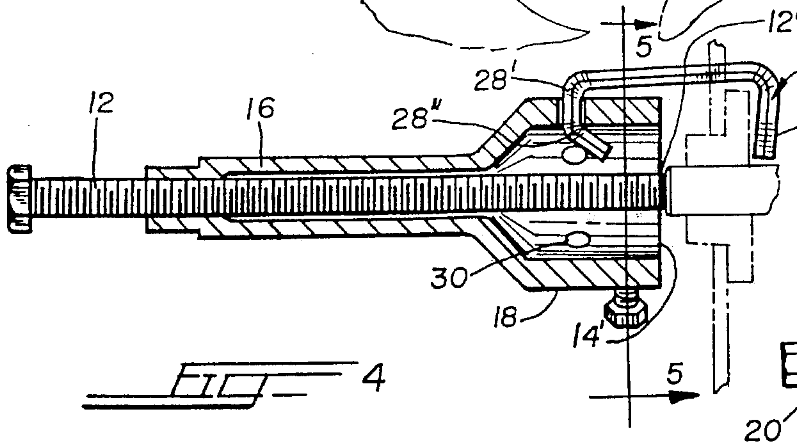
FIG. 4
FIG. 5
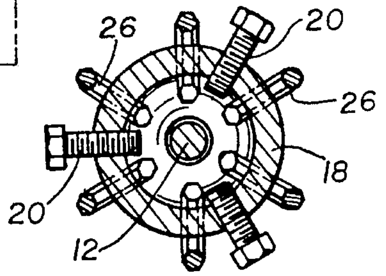
FIG. 6
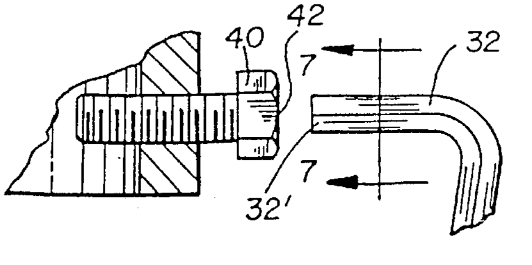
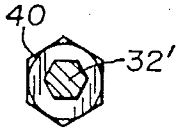
FIG. 7

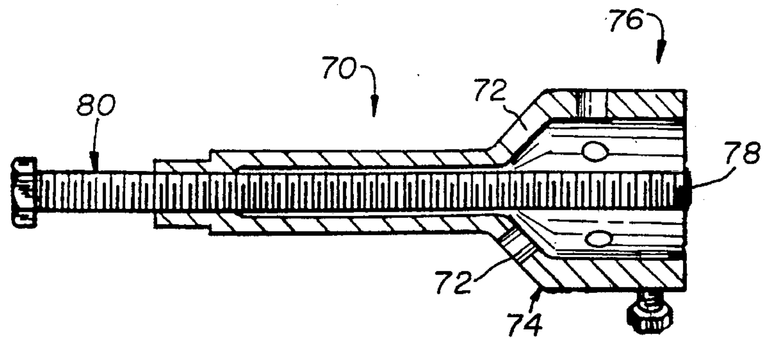
FIG 8
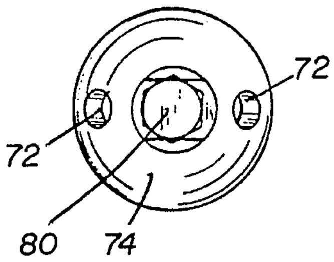
FIG 9
FIG 23
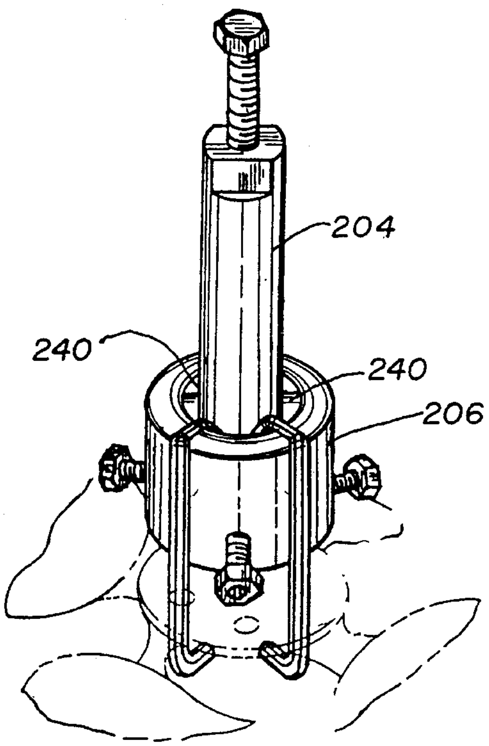

FIG. 10
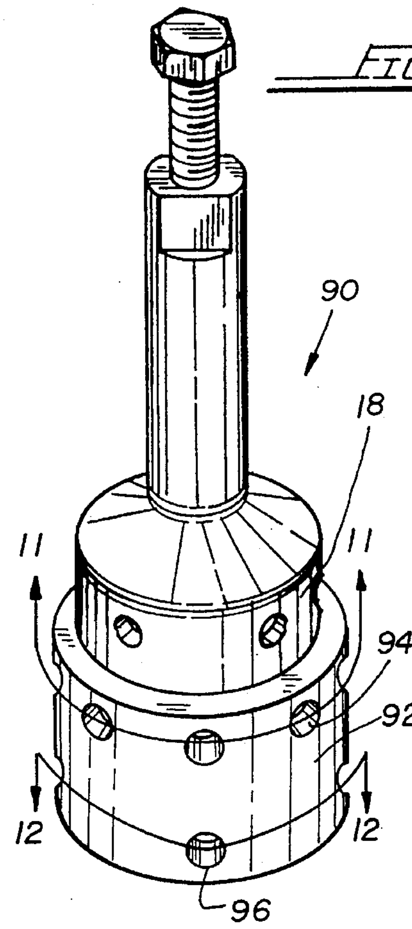
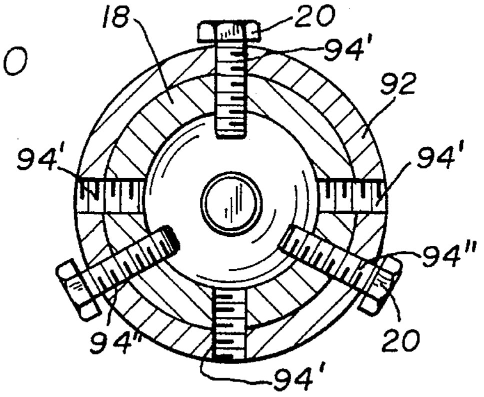
FIG. 11
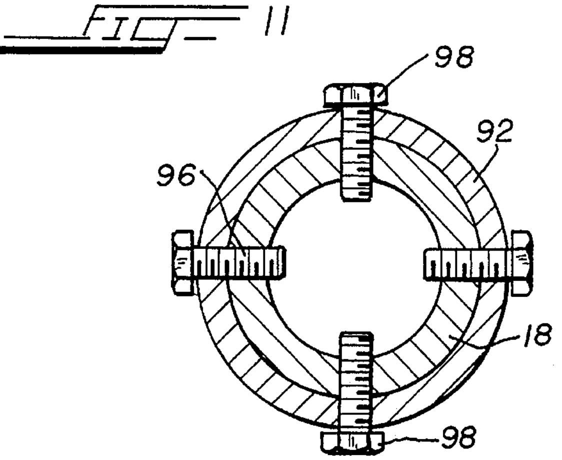
FIG. 12
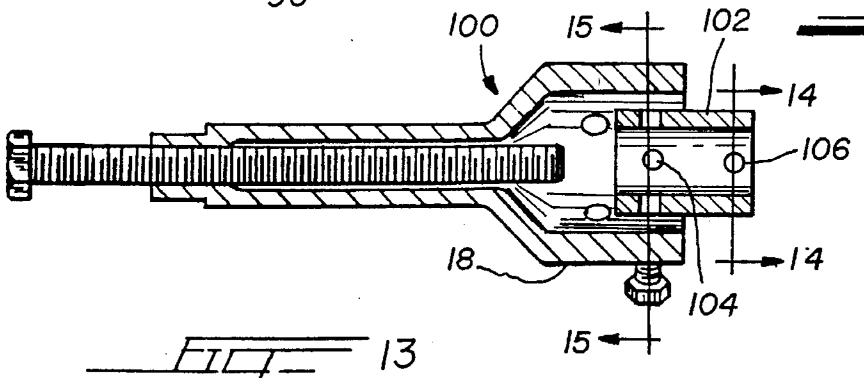
FIG. 13
FIG. 15
FIG. 14
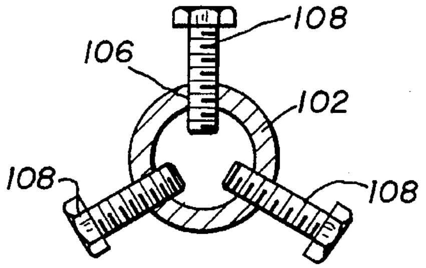
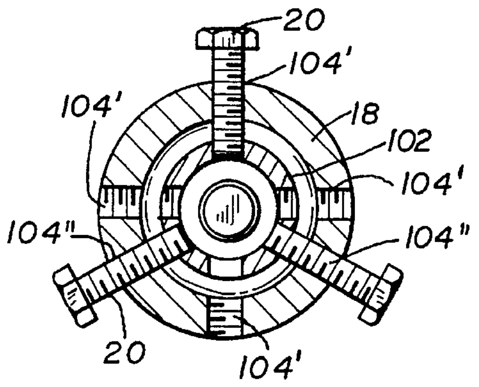

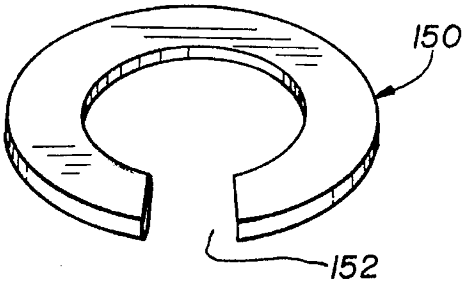
FIG 16
FIG 18
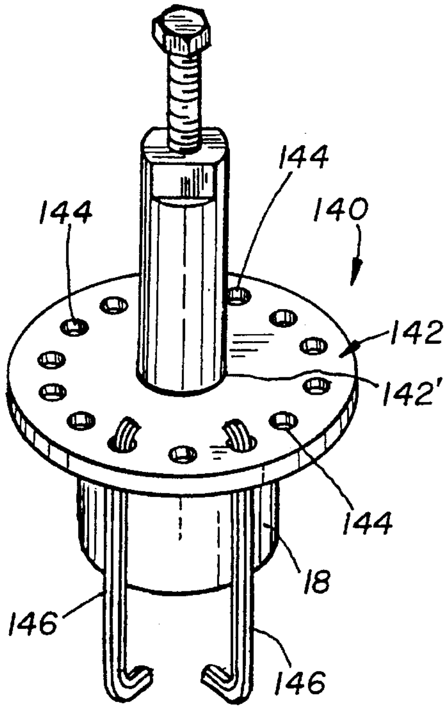
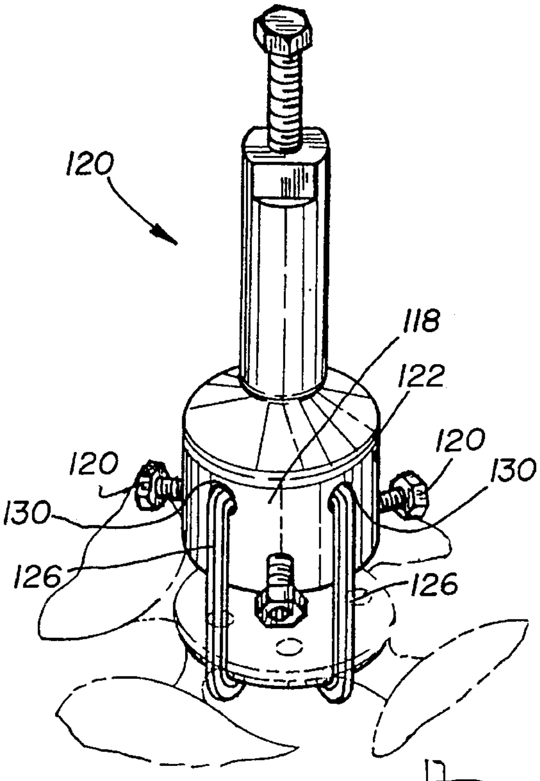
FIG 17
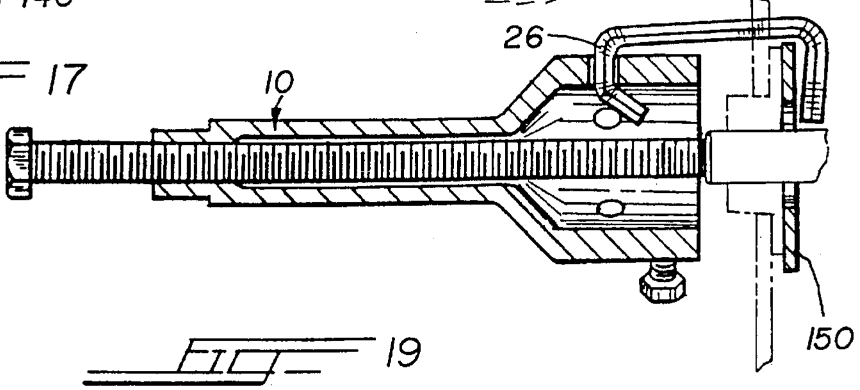
FIG 19

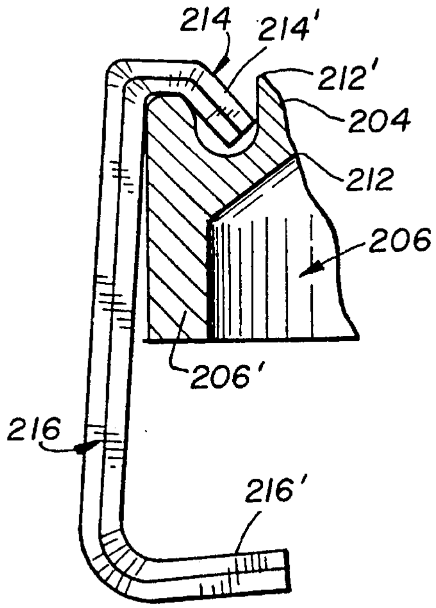
FIG 22
FIG 20
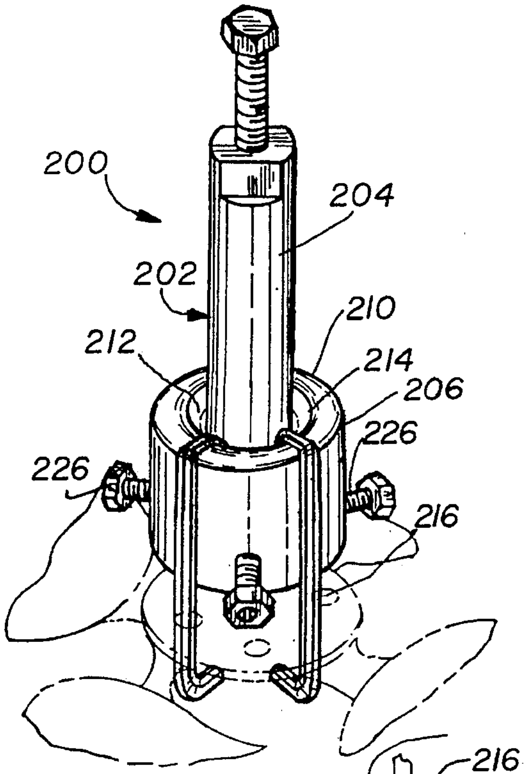
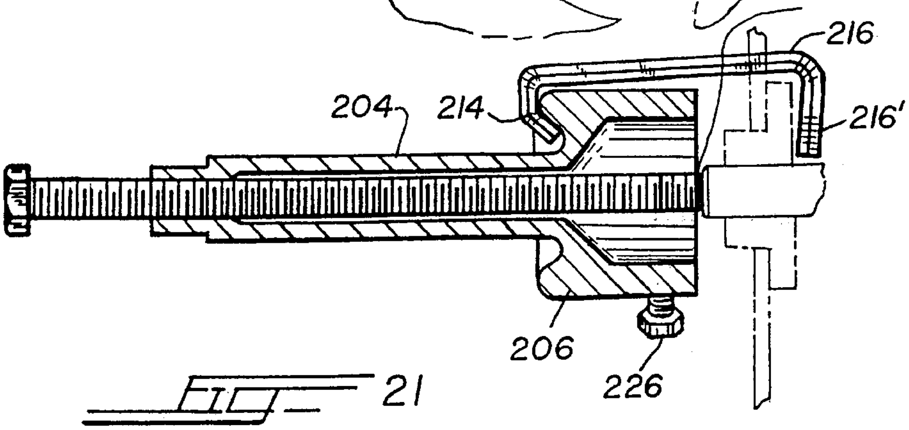
FIG 21

PULLING TOOL

CROSS-REFERENCE TO RELATED APPLICATION

This is a divisional of application Ser. No. 08/219,444 filed on Mar. 29, 1994 now Pat. No. 5,479,688 which is a continuation-in-part of application Ser. No. 08/061,362, filed on May 12, 1993, now U.S. Pat. No. 5,390,404, which is a continuation-in-part of application Ser. No. 07/900,348, filed on Jun. 18, 1992, now U.S. Pat. No. 5,211,211, which is a continuation-in-part of application Ser. No. 07/737,046, filed on Jul. 29, 1991, now U.S. Pat. No. 5,163,211.

BACKGROUND OF THE INVENTION

The present invention is directed to a tool for pulling off a rotor of a motor or a fan from a shaft. In U.S. Pat. No. 4,077,103—Kelley, which is incorporated by reference herein, there is disclosed such a tool for pulling off a rotor of a motor or a fan from a shaft. The tool includes an elongated, rotatable screw that is partially threaded in a hollow housing. The end of the elongated screw can be made to protrude from the end of the housing by rotating the screw in a first direction. By causing the end of the screw to protrude from the housing, the end may be brought into abutting engagement with the end of a shaft on which is mounted a rotor of a squirrel-cage motor, for example, or a fan. The housing is provided with means for securing the housing to either the rotor of a motor or to a fan, whereby, after abutting the end of the elongated screw against the end of the shaft, the screw is rotated causing the housing, with the securing means, to be translated along the screw, in a direction away from the shaft, which housing thereby carries along with it the rotor of the motor or the fan on the shaft to which the securing means had been applied. The securing means takes the form of a plurality of rotatable gripping bolts that are used for gripping the outer surface of a rotor of a motor, or the like, while, for removing a fan, or the like, from a shaft, a plurality of hooked arms are provided with an end of each hooked arm being removably received in a hole of the housing, with the other end "hooking" a rear surface-portion of the fan, whereby the respective rotor or fan, or the like, may be pulled off the shaft according to the method above-described. However, the hooked arms of this patent suffer from the serious disadvantage of falling out from their insertion-hole in the housing. Thus, the tool of the patent is also provided with retaining clips for holding the hooked arms in place, so they do not fall out and become lost, and so they do not interfere with the use of the securing bolts when pulling off a rotor of a motor, or the like, from a shaft. However, these retaining clips have not been found to be practicable in use, and have been ineffective in preventing the hooked arms from falling out and from interfering with the securing bolts for a rotor of a motor. In addition, the shape of the housing in the tool of the patent is square-shaped with the holes formed in the housing for receiving the ends of the hooked arms being provided in two, adjacent pairs, where one pair of holes is formed in one lateral surface face of the housing, and the other pair of holes in the opposite surface face of the housing. This arrangement fixes the manner in which the hooked arms are arranged with respect to the housing, which is a severe detriment to the use of the tool, since not all fans are provided with the same number of vanes nor with vanes of the same angular extent. Thus, where the hooked arms may be perfectly suited for a fan with four blades, the tool can only be used with difficulty for fans having more or less than four vanes, or a fan having vanes of considerably different angular extent.

SUMMARY OF THE INVENTION

The present invention is directed to an improved tool for pulling off a rotor of a motor from a shaft or a fan from a shaft, which improved tool is provided with hooked arms that are releasably but securely held at one end in the housing, without the use of retaining clips, so that the arms do not fall off during use or become lost, and so that they do not interfere with the use of the tool when using the securing bolts for pulling off a rotor. The hooked arms of the invention are also hexagonal-shaped, and the securing bolts are provided with hexagonal-shaped recesses in their heads, so that the hooked arms may themselves be used for rotating the securing bolts when pulling off a rotor of a motor from a shaft. In addition, the housing of the improved tool of the invention is circular in shape, and is provided with a plurality of equally-spaced holes about its circumference, which holes received the hooked ends of the hooked arms, so that various configurations of hooked arms may be provided to best suit the configuration of vanes and type of fan being pulled off from a shaft. To ensure that the each hooked arm is releasably retained in a respective hole of the housing, the end of the arm is provided with a hook defined by a straight piece extending at an acute angle with respect with the main, elongated body of the arm. Also provided are peep-holes for viewing into the interior of the housing, in order to ensure that the end of the screw is properly aligned with the end of a shaft when the tool is used for pulling off a work piece. In another version, instead of the plurality of equally-spaced holes for holding the hooked ends of the hooked arms, an annular groove is provided on the upper, horizontal surface of the lower circular cross-sectioned section of the housing, which annular groove is preferably continuous for 360 degrees about the upper, horizontal surface of the lower circular cross-sectioned section of the housing, whereby there is provided substantially an infinite spacing capability to the hooked ends of the hooked arms. Alternatively, the annular groove may be discontinuous so as to provide a plurality of individual, separated, smaller groove, any one of which may receive therein a hooked end of a hooked arm. In this modification, these smaller grooves are also preferably equally spaced about the upper, horizontal surface of the lower circular cross-sectioned section of the housing, although their spacing may be staggered rather than equally-spaced.

BRIEF DESCRIPTION OF THE DRAWINGS

The invention will be more readily understood with reference to the accompanying drawing, wherein:

FIG. 1 is an isometric view of the pulling tool of the invention;

FIG. 2 is an isometric view thereof showing the tool in use for pulling off a fan from a shaft;

FIG. 3 is a detail view, in partial cross section, showing the shape of the upper end of each hooked securing arm for releasable but securely mounting it in a hole of the housing of the tool of the invention;

FIG. 4 is a longitudinal cross-sectional view of the tool showing the hooked securing arms in use;

FIG. 5 is a cross-sectional view taken along line 5—5 of FIG. 4;

FIG. 6 is a plan view showing the supplemental use of each hooked securing arm for rotating the securing bolts; and FIG. 7 is a cross-sectional view taken along line 7—7 of FIG. 6;

FIG. 8 is a cross-sectional view of a modification of the pulling tool of the invention in which there is are provided sight-holes for viewing the emplacement of the tool;

FIG. 9 is a top view thereof;

FIG. 10 is an isometric view of a modification of the pulling tool of the invention, in which a larger-diameter adapter-tube is attached to the tool of FIG. 1 for pulling off extra-large components with the bolts;

FIG. 11 is a cross-sectional view taken along line 11—11 of FIG. 10;

FIG. 12 is a cross-sectional view taken along line 12—12 of FIG. 10;

FIG. 13 is a cross-sectional view of another modification of the tool of FIG. 1, in which a smaller-diameter adapter-tube is attached to the tool of FIG. 1 for pulling off smaller-size components with the bolts;

FIG. 14 is a cross-sectional view taken along line 14—14 of FIG. 13;

FIG. 15 is a cross-sectional view taken along line 15—15 of FIG. 13;

FIG. 16 is an isometric view showing still another modification of the invention where all of the first and second plurality of holes for the bolts and securing arms are contained in one plane near the bottom, open end of the housing;

FIG. 17 is an isometric view showing yet another modification of the invention where an enlarged, circular disc is placed over the frusto-conical section of the housing by which larger components may be pulled off with the securing arms;

FIG. 18 is an isometric view of another adapter-component that is used to help brace a component being pulled off by the securing arms;

FIG. 19 is a cross-sectional view showing the adapter-component of FIG. 18 in use.

FIG. 20 is an isometric view showing still another embodiment of the tool of the invention, where, instead of the plurality of equally-spaced holes for holding the hooked ends of the hooked arms, an annular groove is provided on the upper, horizontal surface of the lower circular cross-sectioned section of the housing;

FIG. 21 is a longitudinal, cross-sectional view of the tool of FIG. 20;

FIG. 22 is an enlarged detail view, in partial cross section, showing the connection of a hooked end of a hooked arm in the annular groove for retention thereby; and FIG. 23 is an isometric view showing a modified form of the tool of FIG. 20 where a plurality of annular grooves are provided.

DETAILED DESCRIPTION OF THE INVENTION

Referring now to the drawings in greater detail, the tool of the invention is indicated generally by reference numeral 10. The tool includes an elongated, rotatable screw 12 that is rotatably mounted in a hollow housing 14. The length of the screw 12 is greater than the length of the housing, so that the end 12' of the screw may be made to protrude out of the enlarged open end 14' of the housing. The housing 14 is itself divided into a narrow-diameter portion 16, and an larger-diameter portion 18. The narrow-diameter portion prevents the screw 12 from wobbling during use. The larger-diameter portion 18 mounts securing means which contact the element, such as a rotor of a motor or a fan, for pulling it off a shaft. The securing means has a first set of bolts 20 that are rotatable in holes 22 formed in the housing which grip, at their interior ends, the outer, circumferential surface of a rotor to be pulled off from a shaft. The securing means also has a series of hooked, securing arms 26 that are used for gripping a fan for pulling the fan off from a shaft. Each securing arm has a main, elongated portion 26', a first end 28 for passage through one of a plurality of holes 30 formed in the housing, and a second end 32 that "hooks" the fan from behind, in the manner depicted in FIGS. 2 and 4. The above-described parts are conventional, as shown in U.S. Pat. No. 4,077,103—Kelley.

The tool 10, however, is a considerable improvement over the prior art, as described hereinbelow. Whereas the prior art housing was rectilinear in cross section, the larger-diameter housing portion 18 is circular in cross section, with the holes 30 equally spaced thereabout. The number of holes is preferably six in number. This arrangement of the holes 30 allows for the securing arms 26 to be equally-spaced apart which better matches the vanes of a fan to be pulled off, and also allows for different arrangements. For example, when a fan with only three vanes is to be pulled off, only three securing arms 26 need be used, which three are inserted into every other hole 30 to better match the configuration of the fan to be removed. The arrangement of holes 30 allow for other arrangements of the securing arms 26 that suit the particular fan, or similar device, to be pulled off, providing a much more adaptable and flexible tool to suit various types of jobs and environments.

Each securing arm has a first, hooked end 28 made up of a first, substantially-horizontal section 28', and a second, angular section 28". The angular section 28" forms an acute angle with respect to the vertical, center line of the main elongated portion 26' of the securing arm. In the preferred embodiment, this acute angle is between 30 and 60 degrees with respect to the vertical, when viewing FIG. 3. This acute-angle section 28" with horizontal section 28' allows for insertion of the first end of the securing arm through a hole 30 in a relatively easy manner, and yet prevents the accidental removal of the first end from the housing 14. The straight, horizontal section 28' acts as a fulcrum, and ensures that the main elongated portion 26' of the securing arm is allowed to hang downwardly as close to vertical as possible, and provide enough leeway, so that the second end of the securing arm may be "hooked" about the back of a fan, or the like to be pulled off from a shaft, such leeway also resulting from the acute-angle section 28" and its contact against the interior wall surface adjacent the respective hole 30, which provides a fulcrum for rotation a direction perpendicular to the rotation allowed by the horizontal section 28', whereby the securing arm may be rotated to a limited enough degree for entraining the second hooked end of the securing arm in back of the fan for gripping it, if necessary. Each hole 30 has a diameter larger than the diameter of the securing arm, so as to also provide the necessary leeway to the first end 28' of the securing arm to ensure the limited pivoting of the first end 28' about the fulcrum provided by the acute-angle section 28".

Each securing arm 26 of the invention has an hexagonal cross-sectional shape, as seen in FIG. 7. The reason for this is to allow the use of each securing arm for rotating the securing bolts 20. Each bolt has a hex-head portion 40 that may be gripped by a conventional wrench for rotating the bolt, and also has, according to the invention, a hexagonal-shaped recess 42 which receives the hexagonally-shaped end 32' of the second end 32 of a securing arm, whereby the securing arm may be used as a driver for rotating the bolt. Since, when the bolts 20 are used for pulling off a rotor of a motor, the securing arms 26 are not needed, the present invention allows for a dual-function for the securing arms. The other arms 26 not being used to rotate the bolts 20 are prevented from falling out during their nonuse period by the acute-angle section 28" above-described, and also are prevented from interfering with the bolts 20, since they cannot accidentally fall out, and since they only have a very limited capability of angular pivoting in a direction where the second end 32 moves toward the housing portion 18.

Referring to FIGS. 7 and 8, there is shown a modification 70 of the tool. The pulling tool 70 is substantially identical to the tool 10, except for the additions of a plurality of peep-holes or sight holes 72. The holes 72 are placed on the frusto-conical section 74 of the housing section 76. As seen in FIG. 9, two such holes 72 are provided, spaced 180 degrees apart, although more or less than two may be used. When more than two are provided, the holes would also be spaced equidistantly apart. The peep-holes 72 provide a line-of-sight to the interior of the housing 76 when the tool 70 is being put in place. Without the provision of the peep-holes 72, it sometimes ay occur that the end 78 of the screw 80 may not placed directly against the end of the shaft, or the like, but against a different portion, without the user of the tool being aware of it. By providing the peep-holes 72, the user may gaze directly into the interior of the housing section 76, and see directly if the end 78 of the screw 80 is in proper, abutting contact against the end of the shaft. Owing to the frusto-conical shape of the housing section 74, the surface thereof slopes upwardly to meet at a common area. Therefore, the lines of sight provided by each peep-hole 72 intersect the lines of sight provided by the other peep-holes 72, where at least some line-of-sight provided by each peep-hole 72 intersects the end 78 of the screw when the end is extended into its operative engagement with a shaft-end. The holes 72 are made large enough, so that, for all extensions of the screw-end 78, there is a line-of-sight provided thereto. By virtue of the fact that the peep-holes 72 are provided on the frusto-conical section 74, the required size thereof is reduced, since the sloping surfaces of the frusto-conical section 74 naturally direct the lines-of-sight toward the end 78 of the screw, whereby the structural integrity of the housing proper is less compromised. The peep-holes 72 are also preferably placed high enough along the sloping surface of the frusto-conical section 74 so that the required lines-of-sight clear the hooked ends 28 of the securing arms 26 described above, which project into the interior of the housing 74 through the equally-spaced holes 30 seen in FIG. 1. Thus, preferably, each peep-hole 72 is placed above and arcuately between two adjacent holes 30 rather than being aligned with any one of them, although, of course, the alignment thereof may be provided, as long as the peep-holes 72 are large enough in order to provide the proper lines-of-sight.

Referring to FIGS. 10–12, there is shown a modification 90 in which an adapter-tube or component 92 is capable of removable assembly with the tool. The adapter-tube 92 is circular in cross section, and has a larger, inner diameter than the outer diameter of the larger, circular section 18 of the housing of the tool. The adapter-tube 92 has a first plurality of holes 94 that allow some of these holes 94 to align with all of the lower plurality of holes 22 of the tool proper, so that each aligned pair of holes 94-22 may receive therethrough a bolt, like the bolts 40, for fastening the adapter-tube 92 to the housing 18, as seen in FIG. 10. As seen in FIGS. 11 and 12, there is, preferably, provided six such holes 94, in order to be able to secure the adapter-tube 92 to a housing having either three or four holes 22 spaced equidistantly about the lower end of the housing 18 of the tool. Thus, four holes 94' are spaced 90 degrees apart, while two holes 94" are spaced 120 degrees apart. In FIG. 11, the adapter-tube 92 is shown secured to a tool having just three holes 22 for the bolts 20. The adapter-tube 92 also has a lower plurality of holes 96, which are preferably four in number, which holes 96 receive therein bolts 98, like the bolts 20, for attaching the adapter-tube 92, and, therefore, the entire tool, to a larger-diameter rotor, or other larger-diameter component that is to be pulled off, in the same manner as the bolts 20 are used in the embodiment of FIG. 1.

Referring to FIGS. 13–15, there is shown another modification 100 in which a smaller-diameter adapter-tube or component 102 is capable of removable assembly with the tool. The adapter-tube 102 is circular in cross section, and has a smaller, outer diameter than the inner diameter of the larger, circular section of the housing 18 of the tool. The adapter-tube 102 has a first plurality of holes 104 that allow some of these holes 104 to align with all of the lower plurality of holes 22 of the tool proper, so that each aligned pair of holes 104-22 may receive therethrough a bolt like the bolts 20, for fastening the adapter-tube 102 to the housing 18, as seen in FIG. 13. As seen in FIGS. 14 and 15, there is preferably provided six such holes 104, in order to be able to secure the adapter-tube 102 to a housing having either three or four holes 22 spaced equidistantly about the lower end of the housing 18 of the tool. Thus, four holes 104' are spaced 90 degrees apart, while two holes 104" are spaced 120 degrees apart. In FIG. 15, the adapter-tube 102 is shown secured to a tool having just three holes 22 for the bolts 20. The adapter-tube 102 has a lower plurality of holes 106, which are preferably four in number, which holes 106 receive therein bolts 108, like the bolts 20, for attaching the adapter-tube 102, and, therefore, the entire tool, to a smaller-diameter rotor, or other smaller-diameter component that is to be pulled off, in the same manner as the bolts 20 are used in the embodiment of FIG. 1.

In each modification 90 or 100, when the respective adapter-plate is attached, the securing arms associated with the tool may, under certain circumstances, be used in the holes 96 or 106, respectively, instead of the bolts therefor, although the primary function of these adapter-tubes are for the bolts for pulling off rotors.

Referring to FIG. 16, there is shown yet another modification 120 in which all of the first and second plurality of holes 22, 30 of the embodiment of FIG. 1 are contained, or located, in substantially one plane, or level, near the open end of the housing. Thus, in the modification 120, a first plurality of holes 122 for the bolts 120 are three in number, and a second plurality of holes 130 for the securing arms 126 are six in number. The holes 122 are spaced equidistantly apart about the lower end of the circular part 118 of the housing of the tool, which constitutes 120 degrees of arcuate separation. The holes 130 are also spaced equidistantly apart about the lower end of the circular part 118 of the housing of the tool, which constitutes, 60 degrees of separation. Moreover, each hole 122 is sandwiched between, or flanked, by two holes 130, where each hole 130 is, also, separated from another, adjacent hole 130 by one hole 122, as can be seen, in FIG. 16.

Referring to FIG. 17, there is shown yet another modification 140 in which the tool of FIG. 1 is provided with a larger-diameter disc or plate 142. The plate 142 has a central opening 142' which is smaller than the largest-diameter section of the frusto-conical portion 28", but larger than the smallest-diameter section of the frusto-conical portion 28", so that the plate may be removable supported on the frusto-conical portion 28", as seen in FIG. 17 The plate 142 has a plurality of equally-spaced holes 144, which form a circular array of holes about the center of the opening 142'. The radius of this circular array, as measured form the center of the opening 142' to the inner-most radial sections of the holes 144, is greater than the outer diameter of the larger, circular section 18 of the housing of the tool, so that the hooked ends of the securing arms 146 may be inserted in chosen ones of the holes 144, for pulling off larger-diameter components. As shown in FIG. 17, 14 such holes 144 are provided, whereby three or four, or even more than four, securing arms may be inserted into selected ones of the holes 144, which selected holes are those best suited to the specific, larger-size component being pulled off. The securing arms 146 are the same as the arms 26 of FIG. 2, and are used in the same manner. In order to ensure that the plate 142 is supported firmly and equally about its entire periphery, the frusto-conical section 28" may be provided with an intermediate, annular, flat stepped-portion upon which the plate 142 rests. In a version of the tool 10 where there is no frusto-conical section 28", but just the sudden, flat, stepped transition from the smaller-diameter housing-portion 16 to the larger-diameter section 18, then the plate 142 will rest directly upon this transition step.

Referring to FIGS. 18 and 19, there is shown a reinforcing ring 150 that may be used with any of the above-described embodiments. The ring 150 is preferably circular in shape, although such is not a prerequisite, and has an opening, or gap, 152 in it. The reinforcing ring 150 is used when the securing arms pull off a fan, or the like. Since the forces created in the hub of the fan when the securing arms are pulling the fan off are extremely large, there is a possibility that the bending moments created on the hub will harm or warp the hub, preventing its further use, or will impede the process of removal. By placing the reinforcing ring 150 between the hub of the fan (shown in dotted lines in FIG. 19) and the gripping-ends of the securing arms, the forces are distributed over a much larger surface-area, thereby preventing damage to the hub of the fan. Preferably, the diameter of the ring 150 is greater than the diameter of the hub being pulled off so that no portion of the hub is contacted by the securing arms. The gap 152 allows the ring 150 to clear, or pass therethrough, the shaft of the hub of the fan, so that the ring may be emplaced against the hub, as seen in FIG. 19.

Referring to FIGS. 20–22, there is shown an other embodiment 200 of the tool of the invention. In this version, instead of using a plurality of equally-spaced holes for holding the hooked ends of the hooked arms, an annular groove or depression is provided instead, as described hereinbelow. The tool 200 has a main housing,202 consisting of a first, narrower section 204, and a second, larger-diameter section 206, which, as shown, is preferably circular in cross section, although other, noncircular cross sections may be used. In this version, the larger-diameter section 206 is not connected to the upper section 204 by means of a frustoconical section, but is connected to it directly, as seen in FIGS. 20 and 21, to define an upper, annular, stepped horizontal flat surface 210. In this upper, annular, stepped horizontal flat surface 210, there is provided an annular groove or well 212, which, in the preferred embodiment, is continuous and extends a full 360 degrees about the upper flat surface 210. The annular groove 212 has a depth, as best seen in FIG. 22, that allows for firm retention therein of any of the hooked ends 214 of the hooked arm members 216. Preferably, the bottom of the groove 212 is U-shaped, and of such a depth so that when a hooked end 214 is inserted therein, any rotation of the respective hooked arm 216 will cause the end or tip 214' of the hooked end to abut against a portion of the interior wall 212', to thereby prevent the hooked end from escaping the groove, and, thereby, be firmly retained therein. In the preferred embodiment, the interior wall 212' is actually formed by the outer circumferential surface of the first, narrower section 204, as seen in FIGS. 21 and 22. When viewing FIG. 22, the respective hooked arm 216 is allowed ample rotation in the clockwise direction in order to allow for the lower, gripping end 216' thereof to be adequately maneuvered place for gripping a fan blade, or the like, but counter-clockwise direction is limited by the contact of the tip 214' of the hooked end against the juxtapositioned portion of the interior wall 212', whereby, during the use of the tool 200 for pulling off a fan, or the like, the necessary take-up forces are provided between the housing section 206 and the hooked end 214. By utilizing a continuous, 360-degree, annular groove, there is provided a substantially infinite spacing capability for the plurality of hooked ends 214 of the hooked arms. Thus, the only positions which the annular groove 212 could not accommodate are those portions of the groove directly in-line with the bolts 226, since the bolts would interfere with the hanging of the hooked arms and their proper use. However, in the case of the tool 200 where there are no bolts provided, or where the bolts 226 have been removed, then virtually an infinite spacing capability between hooked ends and hooked arms may be achieved, whereby the hooked arms 216 may be spaced apart those distances that suit the particular job for which the pulling tool 200 is being used. Moreover, when the tool 200 is provided with bolts 226, the location of these bolts relative to the lower edge 206' is not critical, since there are no equally-spaced holes required for the hooked ends 214, such as the holes 30 of the embodiment of FIG. 1. Thus, the bolts may be located much farther away from the lower edge 206', thereby providing a greater degree of telescoping of the lower housing section 206 over the part that is to be gripped by the bolts 226 and pulled off thereby. Such an enhanced telescoping capability is advantageous for those parts that are stepped or have sections of different diameters.

Although it is preferred that the groove 212 be continuous for 360 degrees, alternatively, the annular groove may be discontinuous, so as to provide a plurality of individual, separated, smaller groove-sections 240, any one of which may receive therein a hooked end of a hooked arm, as shown in FIG. 23. In this modification, these smaller groove-sections 240 are also preferably equally spaced about the upper, horizontal surface of the lower circular cross-sectioned section of the housing, although their spacing may be staggered rather than equally-spaced. The number of these smaller groove-sections may vary, and can be as few as two, as shown in FIG. 23, or can, preferably be six, equally spaced-apart groove-sections, the same number as the holes 30 in the tool of FIG. 1.

It is also possible to connect the two housing sections 202, 206 by a frustoconical transitional section, such as that shown in the other embodiments, as long as there is provided an outer annular, stepped surface portion for forming therein the annular groove 212.

While specific embodiments of the invention have been shown and described, it is to be understood that numerous changes and modifications may be made therein without departing from the scope, spirit and intent of the invention as set forth in the appended claims.

What is claimed is:

1. In a pulling tool for pulling off a rotor of a motor or a fan from a shaft, said pulling tool comprising an elongated screw having a first end and a second end, a housing with which said screw is threadingly received, said housing comprising a first open end through which threadingly passes said screw, and a second open end through which protrudes said second end of said screw, said housing comprising at least first securing means for releasably holding a fan, or a rotor of a motor, said first securing means comprising a plurality of hooked securing arm-members, each said arm-member having a first end and a second hooked end, said second end of each said arm-member being capable of being hung so as to protrude beyond said second open end of said housing, wherein the improvement comprises:

said housing comprising a first, relatively-narrower section having a first end constituting said first open end, and a second end; and a second, relatively-larger section having a first end connected to said second end of said first section, and a second end constituting said second open end of said housing; said first end of said second section comprising an annular surface portion; said annular surface portion having groove means formed therein for receiving said second end of said arm-members, whereby said arm-members may be suspended thereby.

2. The pulling tool according to claim 1, wherein said groove-means comprises a continuous groove extending for a full 360 degrees about said annular surface.

3. The pulling tool according to claim 1, wherein said groove-means comprises a plurality of separate, spaced-apart grooves extending about said annular surface.

4. The pulling tool according to claim 3, wherein said plurality of grooves are equally-spaced apart about said annular surface.

5. The pulling tool according to claim 4, wherein said plurality of separate, spaced-apart grooves are at least six in number.

6. The pulling tool according to claim 1, further comprising second securing means comprising a plurality of rotatable bolts, and a plurality of holes formed in said housing for threadingly receiving said plurality of bolts, for releasably holding a rotor of a motor, or a fan.

7. The pulling tool according to claim 1, wherein said second section is circular in cross section.

8. The pulling tool according to claim 1, wherein said first securing means comprises at least three arm-members with the first ends of said three arm-members being removably mounted in three said holes of said second plurality of holes; said first securing means comprising at least three bolts mounted in said first plurality of holes.

9. The pulling tool according to claim 1, wherein each said arm-member comprises a main elongated portion, said first end having an acute-angle portion extending at an acute angle with respect to said main elongated portion, whereby each said arm is removably held in said groove means by said acute-angle portion, in order to substantially help prevent accidental removal of said first end therefrom.

10. The pulling tool according to claim 9, wherein said groove means comprises an inner wall and an outer wall, and has a depth for receiving therein each said acute-angle portion of said first ends such that each said acute-angle portion of said first ends engagingly abuts against a respective portion of said inner wall, said respective portion of said inner wall helping to prevent each respective said first end from escaping said groove means.

11. The pulling tool according to claim 1, wherein said inner wall forms part of the outer circumferential surface of said first narrower section of said housing.

* * * * *